March 2, 1937.  J. L. BARR ET AL  2,072,792
DEVICE TO AID STEERING
Filed Nov. 3, 1933  3 Sheets-Sheet 1
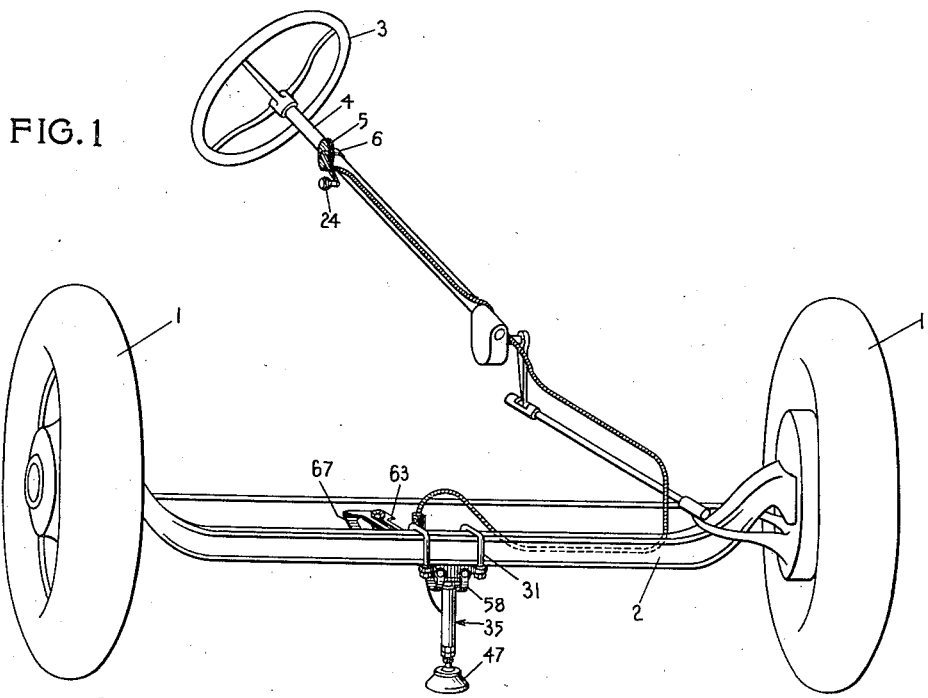
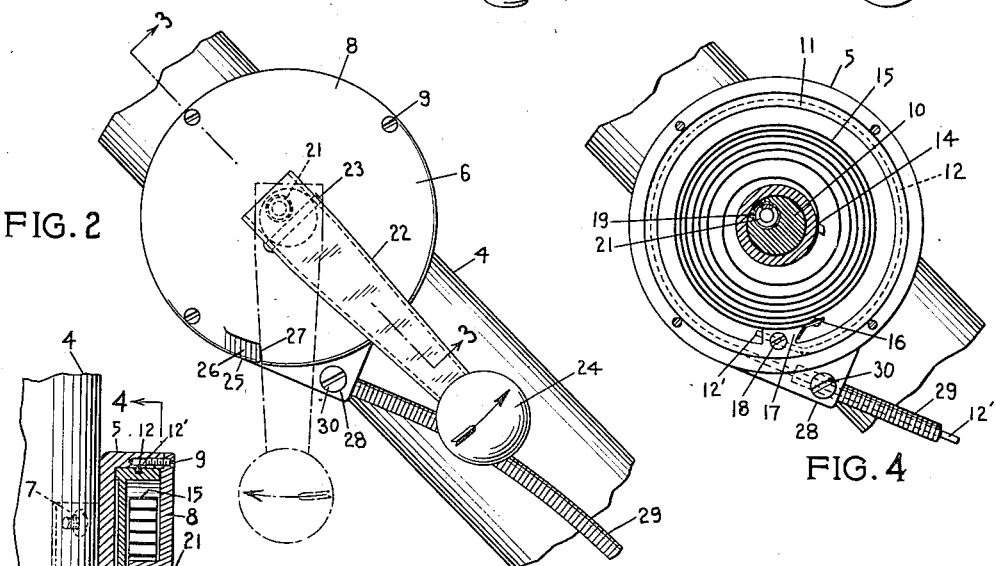
Inventor
John L. Barr
James C. Houghton
By Semmes and Semmes
Attorney

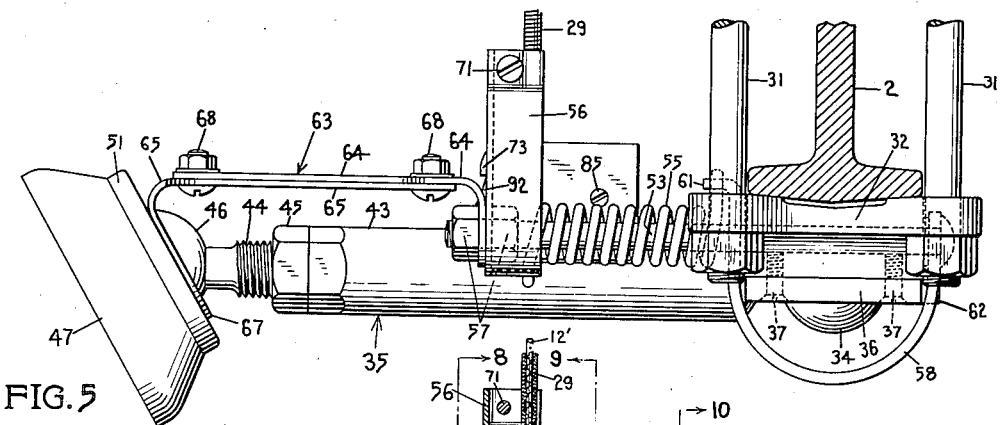
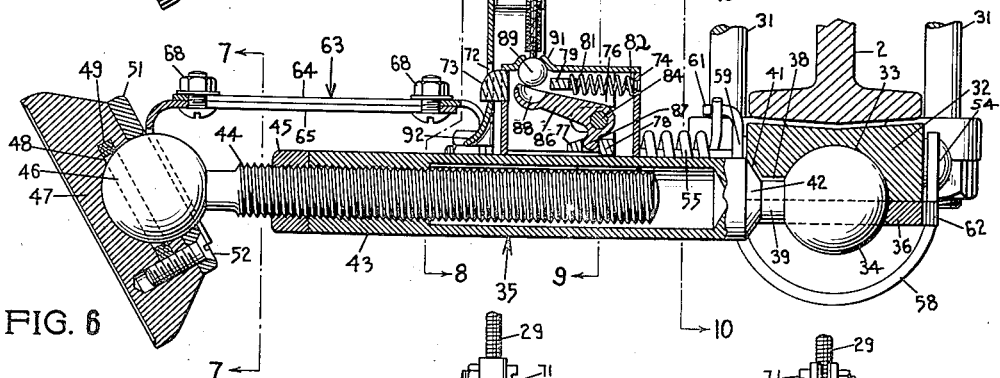
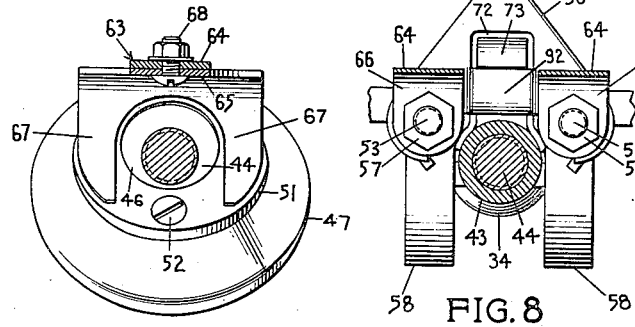
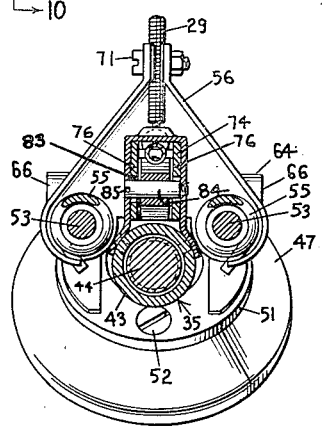
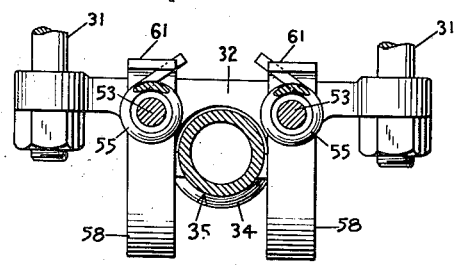

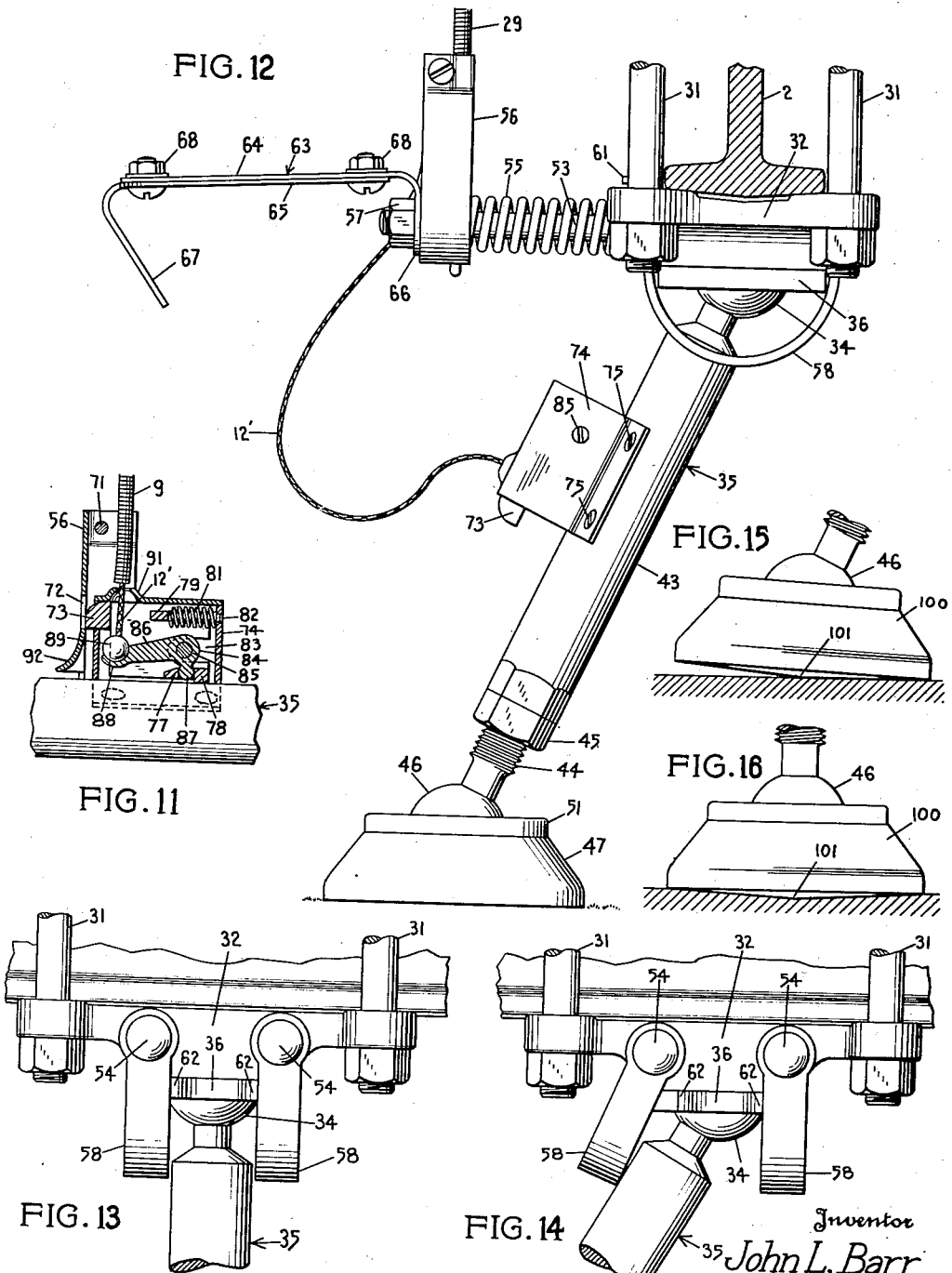
March 2, 1937.  J. L. BARR ET AL  2,072,792
DEVICE TO AID STEERING
Filed Nov. 3, 1933   3 Sheets-Sheet 3
Inventor
John L. Barr
James C. Houghton
By Semmes and Semmes
Attorney Patented Mar. 2, 1937

2,072,792

UNITED STATES PATENT OFFICE 2,072,792

DEVICE TO AID STEERING

John Lester Barr, Chevy Chase, Md., and James C. Houghton, Washington, D. C.; said Houghton assignor to said Barr Application November 3, 1933, Serial No. 696,578

18 Claims. (Cl. 280—150)

This invention relates to devices intended to relieve at least part of the weight, on one or more of the steering wheels of a vehicle to permit the steering wheels to be more easily turned.

The subject matter of the invention is an improvement on the devices disclosed in other copending applications, and in particular our copending application Serial No. 696,579.

In general the objects of the invention are to simplify and improve the operation of such devices. In particular we show and describe in this application convenient means located near the driver's seat for raising and lowering the compression member or leg, which is in general located on the front axle of the car. This means is so arranged that the device may be lowered or raised at will. In the raised position it may be held locked and prevented from rattling. In the lowered position it may be free to move in accordance with the desire of the operator. The lowering device can be locked in the down position so that both hands may be free to manipulate the gears or the steering wheel.

The mechanism for raising the compression element is designed with a spring to wind up the operating wire and hold it in the up position. This, in combination with the locking means for holding the compression element in the up position, together with the device to prevent rattling, provides a sturdy, attractive and noiseless construction, which in no way interferes with the normal function or operation of the car. The latch holding the device in the upper position may be readily released by operating the winding drum in the down direction, and immediately thereafter the device may be lowered into operative position by the same Bowden wire control that effects raising of the compression element.

In the drawings:

Figure 1 is a view partly in perspective of the front wheels of a car with my device in the lowered operative position in contact with the ground, showing the control mechanism;

Fig. 2 is a detail side elevation of the winding drum and the Bowden wire control;

Fig. 3 is a view taken along the line 3—3 of Figure 2;

Fig. 4 is a view taken along the line 4—4 of Figure 3;

Fig. 5 is a detail side elevation of the compression element and the anti-rattler device;

Fig. 6 is a view partly in section taken along the longitudinal axis of the compression element;

Fig. 7 is a view taken along the line 7—7 of Figure 6;

Fig. 8 is a view taken along the line 8—8 of Figure 6;

Fig. 9 is a view taken along the line 9—9 of Figure 6;

Fig. 10 is a view taken along the line 10—10 of Figure 6;

Fig. 11 is a detail view of a locking mechanism showing the position of the parts in effecting a release of the latch;

Fig. 12 is a view in side elevation of the compression element and accompanying mechanism showing the compression element lowered into contact with the ground;

Fig. 13 is a detail view showing the centering ears in their vertical position out of contact with the compression element;

Fig. 14 is a detail view showing one of the centering ears in contact and exerting a centering force on the compression element;

Fig. 15 is a view showing a particular form of conical foot;

Fig. 16 shows the foot in Figure 15 pressed into the ground or roadway.

In the drawings we have shown in Figure 1 an automobile having two steering wheels which in general are front wheels 1, and a front axle 2. On the car is mounted a steering wheel 3 and a steering post 4. The steering post 4 is in general a hollow member which is non-rotatable. Mounted on the steering post 4 is a reel casing 5 which is fastened by means of a strap 6 and holding screws 7 to the steering post 4. The reel casing 5 is provided with a cover 8 which is held in place by screws 9.

Projecting through an aperture in the cover 8 is a stub shaft 10 which may be integrally formed with a cylindrical flanged plate 11 which fits within the casing 5, and which is provided with a groove 12 which contains the Bowden wire 12'. The cover 8 is provided with an interior flange 13 to which is fastened at 14 one end of a spiral spring 15, whose other end is fastened at 16 to a holding piece 17 formed on the interior of the flanged plate 11. The support element 17 formed on the interior of this plate is provided with a screw-hole and a screw 18 which is adapted to hold the end of the Bowden wire 12' before mentioned.

The support piece 17 holds, as above indicated at 16, one end of the spring 15 and the arrangement is such that the spring 15 may be tensioned to rotate the plate 11, and hence the stub shaft 10, with respect to the casing 5 and its cover 8.

The stub shaft 10 is provided with a cylindrical aperture 19 in which is housed a compression spring 21. The lower end of the compression spring 21 lies at the bottom of the aperture 19. The upper end presses against the short end of a winding handle 22 which is pivoted at 23 on the stub shaft 10. The winding handle 22 is provided with a hand grip 24. Formed on the cover 8 is a stop 25 having one sloped surface 26 and one approximately vertical surface 27.

The spring 15 is tensioned to wind up the Bowden wire 12' on the flanged plate element 11. By moving the hand grip 24 in the direction indicated in Figure 2 (solid arrow) the Bowden wire may be extruded through an aperture provided in the support 28 formed on the casing 5. Fixed in the support 28 is a sheath 29 through which the Bowden wire 12' may pass. A screw 30 holds the sheath 29 in place in the support 28 but does not interfere with the free reciprocation of the wire 12' through the sheath upon operation of the hand grip 24.

By reason of the stop the hand grip 24 may be moved as indicated in the direction of the solid arrow and the wire 12' extruded from without the casing through the sheath 29. The lower portion of the winding handle 22 rides over the sloped surface 26 of the stop, compressing the spring 21 in the stub shaft, and then drops into place on the surface 27 of the stop, the tension of the spring 21 causing the handle to be held firmly against the stop. The handle 22 may then be released and the wire 12' will be held in the extruded position, until the hand grip 24 is pulled outwardly to compress the spring 21 to permit the winding handle 22 to pass over the stop 25'. A backward motion of hand grip 24 will withdraw the Bowden wire 12' back into the casing, winding it on the periphery of the plate 11, in which position the wire will be held by the tension of the spring 15. The normal position is that shown in solid lines, Figure 2, which shows the Bowden wire in the withdrawn position wound on the drum 11. In the down position of the compression member the handle is in the position shown in dotted lines in Figure 2, and at that time the compression element can have contact with the roadway and function upon driving the car either forward or backward, as the case may be, to relieve the pressure on at least one of the steering wheels of the car. The length of the compression element is such that the front end of the car is raised slightly to relieve at least in part the weight on one or more of the steering wheels.

The manipulation of the Bowden wire 12' through the hand grip 24 accomplishes several functions, as will be more fully outlined hereinafter.

Held on the front axle of the car by means of U-bolts 31 is a socket element 32 which is provided with a socket depression 33 adapted to receive a ball 34 carried by a compression element 35. The ball 34 is held in a place by a retaining plate 36 which is screwed to the socket element 32 by means of screws 37. A portion of the socket member 32 is cut out, as indicated at 38, to permit the short shank 39 on which the ball 34 is mounted to be nested therein when the compression element is in the uppermost position, as shown, for instance, in Figure 6. There is also provided a conical opening 41, by which abutment of the shoulder 42 with the socket element 32, when the parts are in the position shown in Figure 6, is prevented.

The compression element 35 comprises a female member 43 into which is screwed a male member 44. The upper part of the female member 43 has an enlarged bore to permit the male member to reciprocate therein freely upon adjustment in length of the compression element. A lock nut 45 retains the relative desired positions of the male and female members when the proper length of the compression element has been determined. On the bottom of the male member is a ball 46 which fits into a round aperture made in a foot piece 47.

The foot 47 is provided with an annular oil groove 48 which may contain suitable packing 49 that, when saturated with oil, will lubricate the ball 46 in the socket formed in the foot 47. A retaining plate 51 may be screwed, by means of screws 52, into place on top of the foot piece to hold the ball 46 in the socket 47.

Passing through the socket member 32 are support bolts 53 provided with heads 54. The support bolts carry springs 55, and near their outer ends carry a support housing 56 which is held firmly on the supports 53 by nuts 57.

U-shaped metallic tension ears 58 are pivoted on the supports 53. One end of each of these tension ears is held between each bolt head 54 and the socket member 32. The other end of each of these tension ears is provided with an extension 59 which is bent at right angles, as indicated at 61. Each extension 59 is in contact with one end of each of the springs 55. The other ends of the springs 55 bear against the support housing 56. Stops 62 are provided, limiting the movement of the tension ears 58 so that they do not bear ordinarily directly against the compression element 35, but in their down position provide a small clearance between the compression element 35 and the inner side of the tension ears 58.

These tension ears tend to limit the movement of the compression element 35 in two directions, permitting free movement of the compression element 55 in a forward and backward direction, that is with respect to the ordinary line of travel of the car. These tension ears, however, tend to resist the sideways movement of the compression element 35, so as to insure that approximately a uniform lift will be given to the car each time the driver backs onto, or drives forward onto, the compression element to relieve the weight at least partially on at least one of the steering wheels.

The tension ears, therefore, perform the function of assuring an approximately uniform lift. They also serve a function in preventing undue movement of the compression element by reason of the rotation which may be imparted to the foot 47 when it starts to engage the ground. There would, under certain conditions, be a tendency for the compression element to be moved to the side when the foot 47 engaged the ground, by reason of the forces which may be transmitted through the foot to the compression element.

As stated above, stops prevent too great a movement of the ears inwardly towards each other. Such stops are indicated at 62 (see particularly Figure 13).

To prevent undue vibration and rattle of the compression element 35 in the raised position, we have shown an anti-rattle device which comprises a leaf spring assembly 63. This assembly comprises two leaf spring elements 64 and 65. The element 64 is provided with bifurcated downwardly bent ends 66 which are held firmly between the nuts 57 on the supports 53. The leaf spring element 65 is provided with bifurcated ends 67 which are adapted to fit over the ball 46 at the lower end of the compression element 35 and to bear against the upper surface of the retaining plate 51 which holds the ball 56 in the socket in the foot piece 47. There are slots provided in each of the leaves 64 and 65 which are adapted to fit under the bolt assemblies 68, permitting longitudinal adjustment of the leaves with respect to each other to properly adjust the length of the anti-rattler element 63.

The adjustment and construction is such that in the up position of the compression element 35, as indicated in Figure 6, the anti-rattler element 63 will exert a downward pressure on the plate 51 of the foot piece 47 and this spring pressed tension in a downward direction will prevent undue movement of the compression element 35. This action is readily effected since the element 35 is firmly held in the up position by means of a latch mechanism which is about to be described.

In the top of the support housing 56 fits an end of the sheath 29 of the Bowden wire 12'. This is held in place by means of a nut and bolt assembly 71. The support housing is formed with an aperture 72, as is best seen in Figures 6 and 8. This aperture 72 is adapted to engage with a slidable element 73, thus forming a latch to hold the compression element 35 in the up position. Mounted on the compression element 35 is a housing 74 which is attached to the female member 43 of the compression element 35 by means of screws 75.

The slidable member 73 is mounted on two reciprocable plates 76 which are adapted to slide in the housing 74 (see particularly Figure 9). Between these plates, and joining them, are lateral connecting members 77 and 78 at the bottom and a lateral connecting element 79 near the top. Adapted to bear against this connecting element 79 at the top is a spring 81. The spring 81 fits over a teat provided on the connecting element 79, and over a teat 82 attached to the side of the casing 74. This spring 81 urges the plate 76 in the left-hand direction, looking at the parts in the position shown in Figure 6, which, of course, urges the member 73 in the same direction, with the parts shown in the position in Figure 6. The compression member 35 is prevented from falling and is firmly latched in position by reason of the engagement of member 73 with the aperture 72 in the support housing 56.

The plates 76 are provided with slots 83. Passing through the slots 83 is a pivot piece 84 which may be screwed into position through a screw head 85, as shown in Figures 9 and 12. On this pivot piece 84 is mounted a bell crank lever having an approximately horizontal arm 86, and a short approximately vertical arm 87. The arm 86 is provided with a cup-shaped end, as indicated at 88, which is adapted to cooperate with a ball 89 carried on the end of the Bowden wire 12'. The Bowden wire 12' passes through an aperture in the top of the casing 74, and in the position of the parts shown in Figure 6, the ball 89 rests in a depression 91 formed in the top of the casing 74.

In this position of the parts, the hand grip 24 of the reel mechanism is in the position shown in full lines in Figure 2, and the spring 15 of the reel has wound up the Bowden wire 12' inside the reel. The spring 15 is exerting an upward pulling force on the Bowden wire 12', which tends to hold the ball 89 firmly in place in the depression 91 in the top of the housing 74.

With the parts in the position shown in Figure 6, the slidable member 73 is engaging the lower part of the aperture 72 and the compression element 35 is locked in the upper position. The anti-rattler device 63 is exerting a down pressure on the compression element 35 and all parts are thus held against rattle or undue play. The tension of the spring 15 and the tension of the spring assembly 63 tends to prevent rattling of the parts by reason of vibration which may be imparted to them through movement of the car.

Now, let us assume that the driver wishes to release the compression element 35 from the position shown in Figure 6, thus permitting it to fall so that the foot piece 47 will come in contact with the roadway so that he can drive his car either forward or backward to relieve pressure on the steering wheels. In this case the hand grip 24 is moved by the driver in the direction indicated by the solid arrow and the parts are brought into the position shown in dotted lines in Figure 2. In the meantime the ball 89 has been pushed downwardly to engage the ball cup 88 on the end of the arm 86 of the bell crank lever. The bell crank lever has been pivoted, moving the short arm 87 of that lever to the right with the parts shown in the position in Figure 6, which moves the plate 76 against the tension of the spring 81 to the right, carrying with them the slidable member 73, which will slip out of engagement with the bottom of the aperture 72 on the support housing 57, releasing the latch and permitting the compression element 35 to fall. The length of the wire and the adjustment of the reel mechanism is such as to permit the element 35 to have sufficient play to accomplish the desired functions when the position of the parts in the reel mechanism on the steering post is as indicated by dotted lines in Figure 2.

When the arm 22 of the reel mechanism is raised through the hand grip 24 to disengage contact of the arm 22 with the face 27 of the stop, by turning of the handle, the reel will raise the compression element 35 and the parts will again assume the position shown in Figure 6.

It is to be noted that the support housing 56 is provided with an outwardly sloping section 92 (see Figure 6) which permits the slidable element 73 to slip readily into position because of the contact of the sloping surface of the slidable element 73 and of the section 92 of the support housing 56. It will be seen that the spring 81 is compressed in this latching operation and will shoot the slidable element 73 forward immediately the parts are in the position to permit latching to take place.

In Figure 15 we have shown a type of foot 100 which has a conical bottom portion 101 which in certain conditions of operation, for instance on relatively soft ground, we have found has certain advantages in permitting ready "bite" of the foot into the roadway.

In Figure 16 we have shown the foot in the final position in which the conical portion 101 is sunk into position in the soft footing.

While we have shown and described the preferred embodiment of our invention, we wish it to be understood that we do not confine ourselves to the precise details of construction herein set forth, by way of illustration, as it is apparent that many changes and variations may be made therein, by those skilled in the art, without departing from the spirit of the invention, or exceeding the scope of the appended claims.

We claim:

1. A device of the character described adapted to facilitate steering having a compression element, means supporting and permitting at least limited universal movement of the top of the compression element, a foot having a universal socket with an oil groove therein, an absorbent packing in the groove, and a ball carried by the compression member adapted to be held in operative position in the socket.

2. A device of the character described adapted to facilitate steering having a compression element, means at either end of the compression element permitting universal movement, said compression element comprising a hollow shell and a male member screwed into the shell, the shell being formed with an enlarged bore to house the end of the male member without contact.

3. A device of the character described adapted to facilitate steering having a compression element, means at either end of the compression element permitting universal movement, said compression element comprising a hollow shell and a male member screwed into the shell, the shell being formed with an enlarged bore to house the end of the male member without contact, and locking means preventing relative rotation of the shell and male member once adjustment of the compression element to the desired length has been made.

4. A device of the character described comprising a compression element pivoted on a car, means to hold the element in raised position, a universally pivoted foot for the compression element, and spring means carried by the car exerting force directly on the compression element in its raised position only to prevent vibration of the parts, said spring means holding the foot in cocked position.

5. A device of the character described comprising a compression element pivoted on a car, means to hold the element in raised position, a universally pivoted foot for the compression element, and leaf spring means carried by the car and exerting force directly against the compression element in its raised position to prevent rattling of the device, said leaf spring being provided with a down-turned forked end to straddle the compression element.

6. A device of the character described comprising a compression element pivoted on a car, means to hold the element in raised position, spring means formed of a plurality of overlapping leaves carried by the car and exerting force on the compression element in its raised position, and means permitting longitudinal adjustment of the overlapping leaves.

7. A device of the character described comprising a compression element pivoted on the car, latch means to hold it in the raised position, comprising a holding member on the car, a slidable member adapted to engage the holding member and carried by the compression element, a pivoted lever carried by the compression element to move the slidable member, and means operable from the driver's seat to move the lever.

8. A device of the character described comprising a compression element pivoted on the car, latch means to hold it in the raised position, comprising a holding member on the car, a slidable member adapted to engage the holding member and carried by the compression element, a pivoted lever carried by the compression element adapted to move the slidable member, and a Bowden wire control movable from a remote location to move the lever.

9. A device of the character described comprising a compression element pivoted on the car, latch means to hold it in the raised position, comprising a holding member on the car, a slidable member adapted to engage the holding member and carried by the compression element, a pivoted lever carried by the compression element adapted to move the slidable member, and a Bowden wire control movable from a remote location to move the lever, and a spring tensioning the slidable member in a locking position.

10. A device of the character described comprising a compression element pivoted on the car, latch means to hold it in the raised position, comprising a holding member on the car, a slidable member adapted to engage the holding member and carried by the compression element, a pivoted lever carried by the compression element to move the slidable member, and a Bowden wire control movable from a remote location to move the lever to move said members and to raise and lower the compression element.

11. A device of the character described comprising a compression element pivoted on the car, latch means to hold it in the raised position, comprising a holding member on the car, a slidable member adapted to engage the holding member and carried by the compression element, a pivoted lever carried by the compression element to move the slidable member, and a Bowden wire control movable from a remote location to move the lever to move said members and to raise and lower the compression element, and a spring tensioning the slidable member in a locking direction.

12. A device of the character described comprising a pivoted compression element attached to a car, a Bowden wire control for raising and lowering the compression element adapted to permit movement without varying the action of the device, and a reel near the driver's seat on which the Bowden wire is wound, and latch means adapted to be disengaged by the Bowden wire.

13. A device of the character described comprising a pivoted compression element attached to a car, a Bowden wire control for raising and lowering the compression element and adapted to permit movement without varying the action of the device, a reel near the driver's seat on which the Bowden wire is wound, and a spring tensioning the reel in the up position, and latch means for holding the element in the up position operated by the Bowden wire.

14. A device of the character described comprising a pivoted compression element attached to a car, a Bowden wire control for raising and lowering the compression element and adapted to permit movement without varying the action of the device, a reel near the driver's seat on which the Bowden wire is wound, a spring tensioning the reel in the up position, and a stop to hold the reel in the down position, and latch means for holding the element in the up position operated by the Bowden wire.

15. A device of the character described comprising a compression element pivoted on the car; latch means to hold it in the raised position, comprising a holding member on the car, and a slidable member adapted to hold the holding member and adapted to permit movement without varying the action of the device; a Bowden wire control for raising and lowering the compression element; a reel near the driver's seat on which the Bowden wire is wound; and means permitting the Bowden wire to disengage the slidable member from the holding member.

16. A device of the character described comprising a compression element pivoted on the car; latch means to hold it in the raised position, comprising a holding member on the car, and a slidable member adapted to hold the holding member and carried by the compression element; a Bowden wire control for raising and lowering the compression element and adapted to permit movement without varying the action of the device; a reel near the driver's seat on which the Bowden wire is wound; means permitting the Bowden wire to disengage the slidable member from the holding member; a spring tensioning the reel in the up position; and a stop to hold the reel in the down position.

17. A device of the character described comprising a compression element pivotally attached to a car, means including a push-pull cable for lifting said compression element to inoperative position, locking means including a latch to secure said compression element in inoperative position, and means responsive to a movement in said cable opposite in direction to its movement when the compression member is lifted, to unlatch said lock, whereby said compression element is raised to inoperative position when said cable is moved in one direction, and is unlocked when said cable is moved in the opposite direction.

18. In a device of the character described for a vehicle, a lift element movably supported on the vehicle, a Bowden wire to raise and lower the element, latching means to hold the element in its raised position, the Bowden wire also operating the latch means, and spring means tending to move the wire into latching position.

JOHN LESTER BARR.
JAMES C. HOUGHTON.